Oct. 19, 1954

J. J. SHIVELY 2,691,954

MARINE MOTOR AND PROPULSION UNIT

Original Filed July 24, 1947

INVENTOR.
John J. Shively
BY
Van Deventer & Shively
ATTORNEYS

Oct. 19, 1954     J. J. SHIVELY     2,691,954
MARINE MOTOR AND PROPULSION UNIT
Original Filed July 24, 1947     6 Sheets-Sheet 5

INVENTOR.
John J. Shively
BY
VanDeventer & Shively
ATTORNEYS

Oct. 19, 1954  J. J. SHIVELY  2,691,954
MARINE MOTOR AND PROPULSION UNIT
Original Filed July 24, 1947  6 Sheets-Sheet 6

INVENTOR.
John J. Shively
BY
Van Devanter & Shively
ATTORNEYS

Patented Oct. 19, 1954

2,691,954

UNITED STATES PATENT OFFICE 2,691,954

MARINE MOTOR AND PROPULSION UNIT

John J. Shively, New York, N. Y.

Original application July 24, 1947, Serial No. 763,200. Divided and this application September 20, 1951, Serial No. 247,470

5 Claims. (Cl. 115—18)

The present invention pertains to improvements in marine motors and propulsion units, this application being a division of my copending application Serial Number 763,200, filed on July 24, 1947, now U. S. Patent No. 2,569,346.

An object of the invention is to provide an improved internal combustion engine for marine propulsion and the like.

Another object is to provide an improved method of cooling and lubricating internal combustion engines.

Another object is to provide an engine of the above type embodying improved cooling and lubricating means to carry out the method.

Another object is to provide an improved engine and propelling combination adapted to outboard mounting and operation.

A further object is to provide a device of the above nature embodying twin propellers rotatable at equal speeds from the common power source.

A further object is to provide a device of the above nature wherein steering is accomplished by swinging the propellers in relation to the power source.

A still further object is to provide a device of the above type wherein the two vertical shafts transmitting torque to the propellers are revolved in opposite directions whereby torque reaction is balanced to promote ease and uniformity in steering.

A still further object is to include common means in a device of the above type to swing simultaneously the lines of thrust of both propellers outwardly and forwardly, whereby neutral and reverse operating positions may be provided without clutches or gear shifts and whereby the two lines of thrust may be simultaneously shifted to differing angular relation with the boat by manipulation of the steering means.

Another object is to provide propulsion and power means of the above nature in which a common fluid may be used for lubrication thereof and for cooling the internal combustion engine portion.

A yet further object is to provide heat exchange means between the common cooling and lubricating fluid and the water in which the propelling means is operating.

A still further object is to provide heat-exchange means of the above nature adapted to serve as an anti-cavitation member whereby propulsive efficiency may be promoted.

Other objects and advantages of the invention will become evident during the course of the following description in connection with the accompanying drawings in which.

Figure 1:
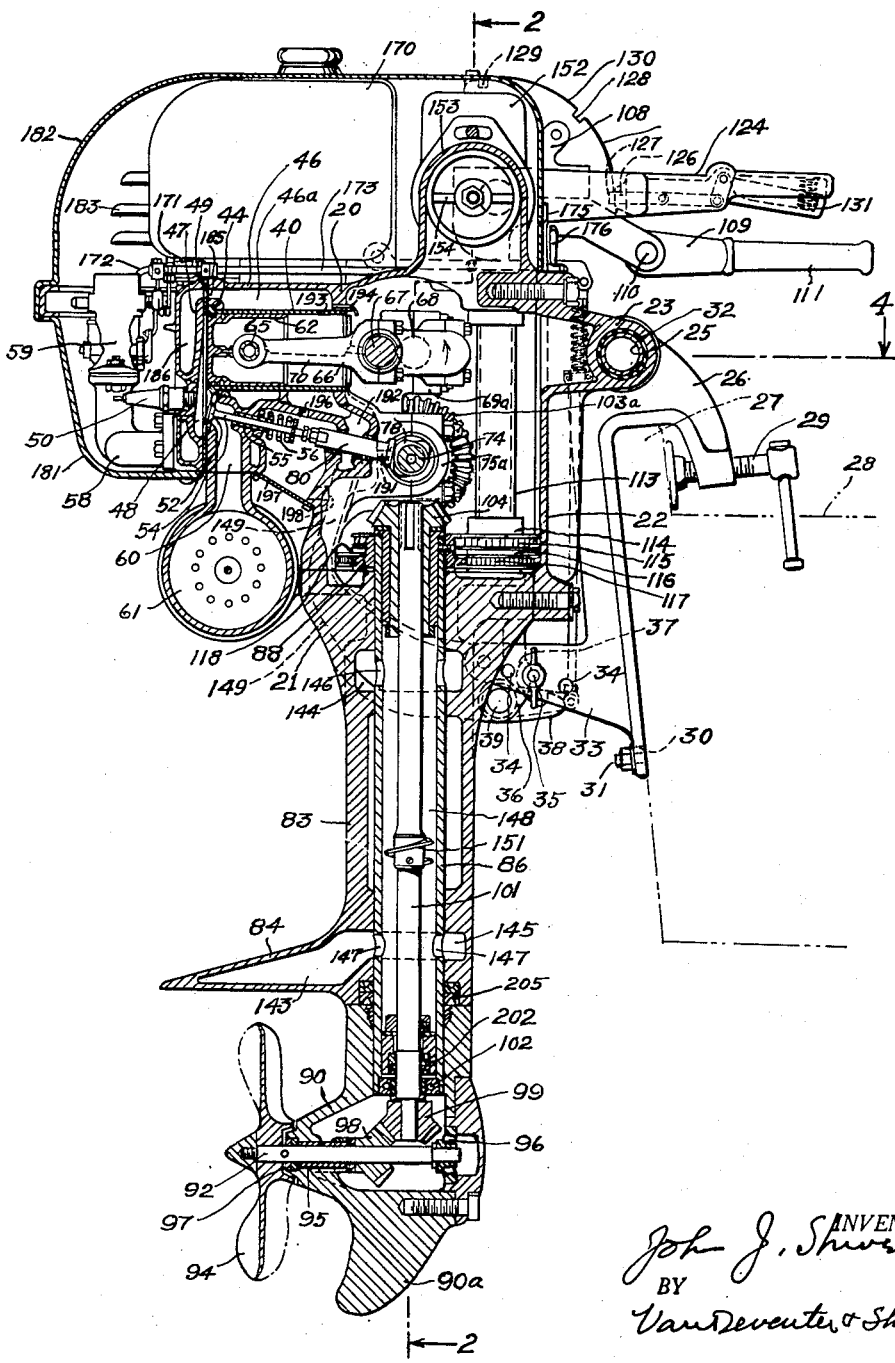
Figure 1 is a vertical sectional view of a preferred form of the device taken approximately in the plane 1—1, Figure 2.
Figure 2:
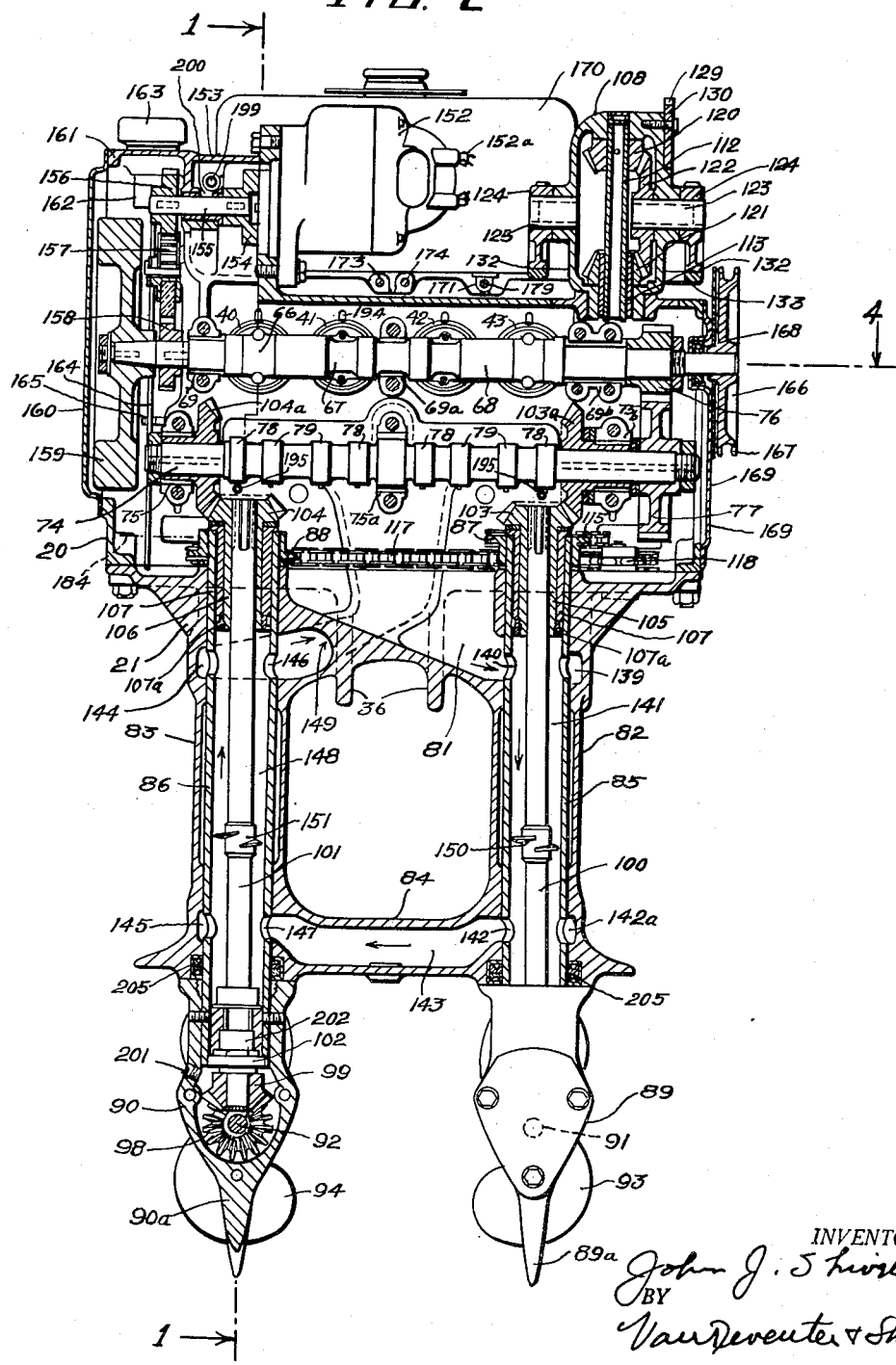
Figure 2 is a vertical transverse view partially in section approximately in the plane 2—2, Figure 1.
Figure 4:
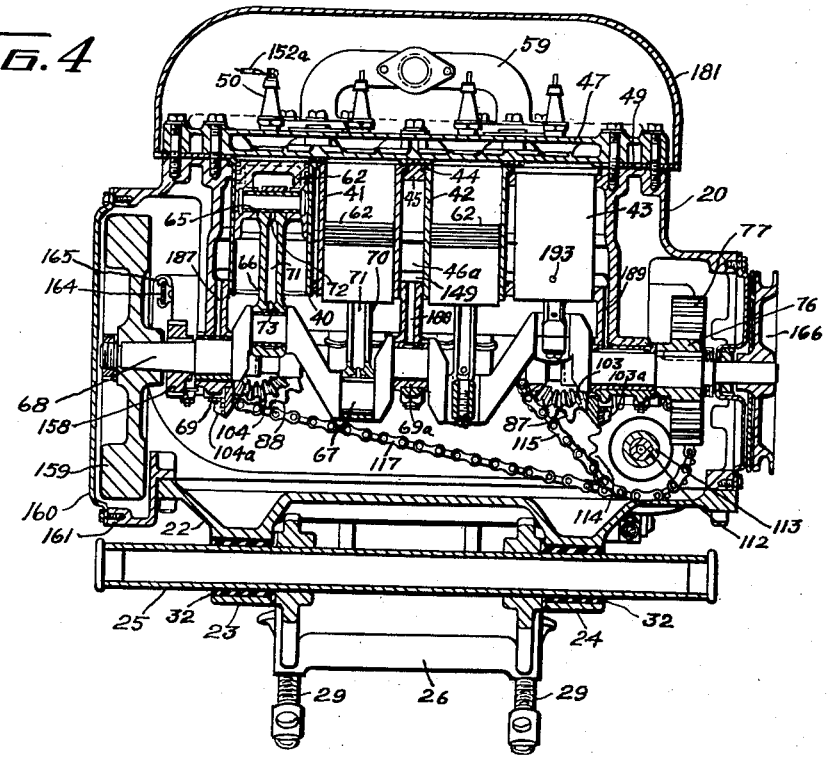
Figure 4 is a horizontal sectional view principally in the plane 4—4, Figures 1 and 2.

Referring first to Figures 1 and 2, the numeral 20 generally denotes an engine body, preferably of cast aluminum or the like, which is bolted to a middle or drive-shaft housing 21. A closure plate 22 is secured to the front of body 20 and middle housing 21. Brackets 23 and 24, Figures 1 and 4, are formed on the plate 22 and are hinged horizontally by means of a transverse tube 25 to a clamp member 26 adapted to be secured to the transom 27 of a boat 28 by means of suitable clamping screws 29. The lower end of clamp member 26 may be constructed with a vertical slot 30 adapted to engage a bolt 31 secured in the transom 27 to equalize driving stress on the transom during operation in reverse as hereinafter described. The brackets 23 and 24 may be provided with bushings 32 of rubber or the like to form a cushion mounting.

Rearwardly directed extensions 33 on clamp member 26 have therein a series of cross-holes 34 disposed on a common radius from the hinge-tube 26 as a center and adapted to receive a transverse thrust bolt 35. Abutments 36 on the lower housing 21 may be provided with resilient buffers 37 normally engaging the thrust-bolt 35. A wide hook 38, secured on a rocker-shaft 39 journalled transversely in the abutments 36, is adapted to be swung upward to engage the forward side of the thrust-bolt 35 by means which will be set forth hereafter in connection with the description of reverse operation.

Four cylinder sleeves 40, 41, 42 and 43 are disposed in the rear upper portion of the body 20, terminal flanges 44 on the sleeves being recessed in the rear body wall 45. The outer walls 46 of body 20 are spaced from the sleeves 40, etc. to form a jacket-space 46a. A head 47 is secured to the body 20, forming a closure for the upper ends of the cylinder sleeves and having depressions providing combustion chambers 48. A suitable gasket 49 is interposed between the body 20 and the head 47. The usual spark plugs 50 are mounted in the head 47 in communication with the combustion chambers 48. The combustion chambers 48 extend downwardly in "L-head" construction as illustrated in Figure 1, and are provided with inclined inlet and exhaust valves 51 and 52, respectively. The valve stems 54 are guided in sleeves 55 and are fitted with suitable closing springs 56. The inlet valves 51 communicate via cored passages 57, Figure 12, through the body 20 and head 47 with an exterior manifold 58 to which is attached a carburetor 59 of any suitable type, herein illustrated as of down-draft construction. The exhaust valves 52 are connected via downward passages 60 with a muffler 61 secured to the under side of the body 20.

Pistons 62 are slidably fitted in the cylinders 40, 41, 42 and 43 and are provided with wrist pins 65 connected via connecting rods 66 with crank-pins 67 of a transverse crankshaft 68, the latter being journalled in capped bearings 69, 69a and 69b, secured in the body 20. The shanks 70 of the connecting rods 66 are preferably of U-shaped cross section to form troughs 71 adapted to catch lubricant and direct it via inclined holes 72 and 73, Figure 4, to the bearing surfaces of wrist-pins 65 and crank-pins 67.

A combined camshaft and jackshaft 74 is disposed in cap-bearings 75, 75a and 75b directly below the crankshaft 68.

The camshaft 74 is driven at one-half crankshaft speed via crankshaft pinion 76 and mating camshaft gear 77. While the pinion 76 and gear 77 are illustrated as straight spur type, it will be understood that they may be of helical or herringbone construction if desired. Exhaust cams 78 and inlet cams 79 on the shaft 74 are provided to operate the valves via adjustable tappets 80 as illustrated in Figure 1.

The middle housing 21 comprises an upper portion forming a sump 81, hollow vertical port and starboard columns or drive shaft housings 82 and 83, and a hollow bridge 84 connecting the lower ends of the columns. The bridge 84 is shaped to act as an anti-cavitation plate to augment propeller efficiency, and also operates as a heat exchanger for the engine cooling system as hereinafter set forth.

Vertical shaft tubes 85 and 86 are rotatably mounted in the columns 82 and 83 respectively. Chain sprockets 87 and 88 are secured to the upper ends of the tubes 85 and 86, comprising parts of the steering system as hereinafter described and also serving as thrust collars to retain the tubes against downward movement in the columns. Propeller shafts housings 89 and 90 are rigidly secured to the lower ends of the tubes 85 and 86 respectively and may be provided with suitable skegs 89a and 90a. Horizontal propeller shafts 91 and 92, carrying propellers 93 and 94 of opposite pitch respectively, are mounted in suitable bearings 95 and 96 and are provided with seals 97 to prevent leakage of lubricant from and entry of water into the housings 89 and 90.

Bevel gears 98 on the shafts 93 and 94 mesh with mating bevels 99 on the lower ends of vertical drive shafts 100 and 101 which are centrally disposed in the tubes 85 and 86. Ball bearings 102, fitted in the lower ends of tubes 85 and 86 provide radial support at these points for the drive shafts 100 and 101 and also take the vertical thrust of the bevel gears 99.

The upper ends of shafts 100 and 101 are slidably splined in upwardly directed bevel gears 103 and 104, which gears are formed with lower sleeves 105 and 106 respectively, journalled in bushings 107 secured in the upper ends of the tubes 85 and 86. Retaining collars 107a may be provided on the lower ends of the gear sleeves 105 and 106 to engage the lower ends of bushings 107.

The gears 103 and 104 are in mesh respectively with bevel gears 103a and 104a on the camshaft 74. It will be noted that gears 103a and 104a are secured on the shaft 74 in opposed relation, meshing with gears 103 and 104 on diametrically opposite sides of the latter. By this arrangement it is evident that rotation of the camshaft 74 causes the vertical shafts 100 and 101 to be driven in opposite directions, opposite directional drive being imparted similarly through the previously described lower end gearing combinations to the two propellers 93 and 94.

Figure 5:
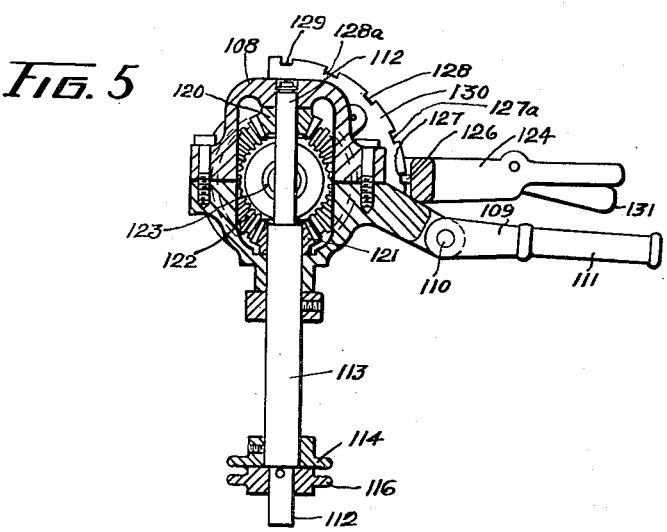
Figure 5 is a detail illustration of the steering head and tubes.
Figure 6:
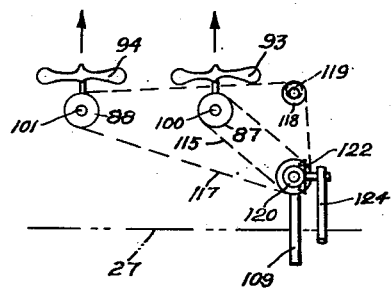
Figure 6 is a diagrammatic illustration of the propellers in straight forward drive position.

A hollow steering head 108 is journalled for horizontal rotation in the upper forward portion of the body 20 on the port side as shown in Figures 1 and 2. A steering handle or tiller 109, Figure 1, extends forward from the head 108 and may be provided with a hinge joint 110 to permit the hand grip portion 111 to be swung upward out of the way when desired. An inner steering tube or pivot 112, Figures 2, 4 and 5, is journalled at the top in the upper end of the steering head 107 and at the bottom in the middle housing 21. An outer steering tube or sleeve 113 is rotatably mounted on the inner tube 112. The lower end of the tube 113 carries a sprocket 114 which is connected by a chain 115 with the sprocket 87 on the port shaft tube 85. Similarly, a sprocket 116 on the lower end of inner tube 112 is connected by a chain 117 to the sprocket 88 on the starboard drive shaft tube 86. An idler sprocket 118 is provided to allow the chain 117 to clear the port tube 85 and its upper fittings. The idler 118 may be provided with eccentric mounting 119 as indicated in Figure 6, to permit shifting it to tighten the chain 117 if necessary.

Opposed bevel pinions 120 and 121, secured on the upper portions of steering tubes 112 and 113 respectively, mesh with a bevel gear 122 fastened to a pin 123 horizontally journalled in the steering head 108 as shown in Figure 2. A forked reverse lever 124, Figures 1, 2, 3 and 5, is fastened to the pin 123 and is adapted to swing in a vertical plane, a second pin 125 being secured in the forked end of the lever and journalled in the head 108 to insure lateral stability of the lever 124 and gear 122. A spring-pressed latch 126 in the lever 124 is adapted to selectively engage notches 127, 128 and 129 in a quadrant 130 secured to the steering head 108, and is adapted to be withdrawn from the notches by means of a hand-grip lever 131.

Figure 3:
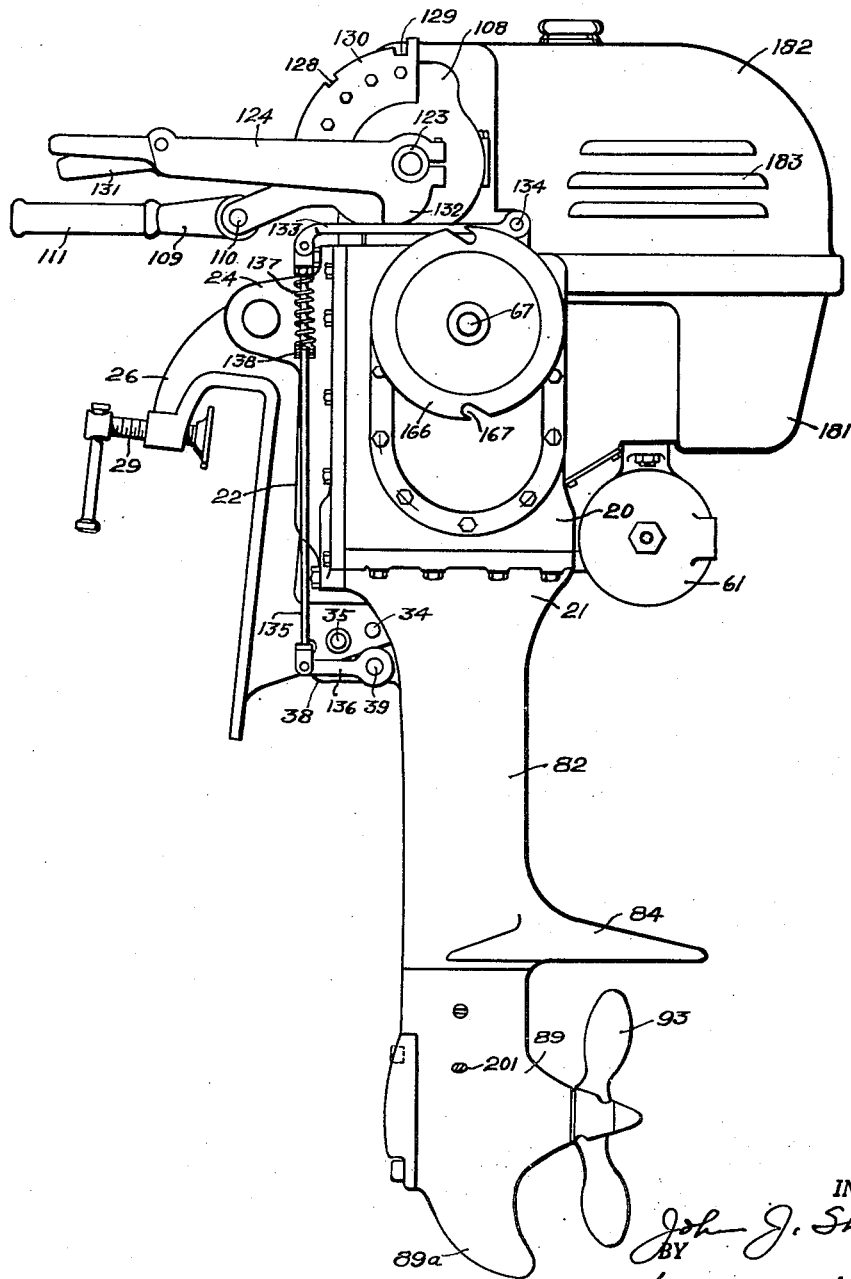
Figure 3 is an elevation of the unit viewed from the port or left side.

Cam lobes 132 on the under sides of the forked portion of the reverse lever 124 normally engage a ring plate 133, which is horizontally hinged at 134, Figures 1 and 3. A rod 135 links the hinged ring plate 133 with a small arm 136 on the end of the rocker shaft 39 which carries the hook 38 as previously noted. A compression spring 137 on the rod 135 is supported by a small fork 138 secured to the front plate 22. The spring 137 urges the rod 135 upward, tending to rock the arm 136 and the hook 38 upward. In the normal or forward position of the reverse lever 124, the cam lobes 132 hold the ring-plate 133 and hence the hook 38 in downward position, the hook thus clearing the thrust bolt 35. When the reverse lever 124 is swung upward out of forward position as hereinafter more fully set forth, the lobes 132 withdraw from the ring plate 133, allowing the spring 137 to rock the hook 38 upward into position to engage the forward side of the bolt 35. Thus the unit is locked against swinging outward upon reversal of propelling thrust.

Referring to Figure 2, it will be seen that the sump 81 slopes directly into a pocket 139 surrounding the port driveshaft tube 85. Apertures 140 in the tube 85 form passage-ways from the sump pocket 139 to the annular space 141 in the tube 85 surrounding the drive shaft 100. Lower apertures 142 lead via a lower pocket 142a to the hollow interior 143 of the bridge-plate 84. Upper and lower pockets 144 and 145 are also provided around the starboard drive shaft tube 86, apertures 146 and 147 leading from the pockets into the annular space 148 around the drive shaft 101. The lower pocket 145 opens into the bridge-plate interior 143, while the upper pocket 144 is in communication with the cylinder jacket space 46a via a cored passage 149, Figures 1, 2 and 4.

Small helical impellers 150 and 151 are secured on the drive shafts 100 and 101 near the lower ends of the annular spaces 141 and 148 respectively, both impellers having the same direction of lead or twist.

A magneto 152 is mounted on an upward extension 153 of the body 20. The magneto is driven through an impulse coupling 154 of known type, a shaft 155, gears 156 and 157 and a crankshaft pinion 158. The magneto is connected with the spark plugs 50 by wires 152a in the usual way, the wiring being cut away in the drawings to simplify the latter. The numeral 159 denotes a flywheel secured to one end of the crankshaft 68, a cover 160 being secured on the end of the flywheel housing 161. A combined oil filler and breather 162 in the upper rear portion of the housing 161 is surmounted by a cap 163. An oil depth gage 164, normally held in a clip 165, Figures 2 and 4, may be removed for inspection through the breather 162 in the known manner common to automobile engine practice. The left or port end of the crankshaft 68 carries a starter of any suitable type, herein illustrated by a rope-sheave 166 having notches 167 for receiving the end of a starting rope. A seal 168, held in a closure cap 169, prevents outward leakage of lubricant along the shaft 68.

A fuel tank 170, Figures 1 and 2, is mounted on the top of the body 20, and is adapted to feed fuel through a shut-off valve 171 and tube 172 to the carburetor 59. As the internal structure of fuel tanks is well known and forms in itself no part of the present invention, the tank 170 is not shown in section.

Figure 10:
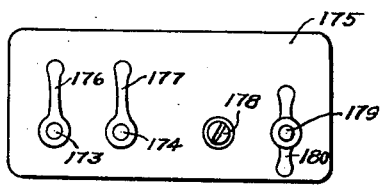
Figure 10 is a detail front view of the panel board and associated control levers.

Choke and throttle control shafts 173 and 174 extending forward below the tank 170 and through a small panel or dashboard 175 on the forward side of the body 20, carry operating levers 176 and 177 respectively. A turn-off switch 178 for the magneto 152 is also mounted on the panel 175. The fuel valve 171 may be controllable from the front of the unit through a rod 179 and a handle 180 in front of the panel 175, as shown in Figure 10. A removable lower shield 181 and a hood 182, Figures 1, 3 and 4, protect the carburetor, spark plugs, magneto and related parts from splash and rain. To clarify the showing of the inner parts, the hood and shield are removed in Figures 2 and 12.

Louvres 183 in the hood 182 provide for engine ventilation and for intake air to the carburetor 59.

In operation, the unit is clamped to the transom 27 of the boat 28 by means of the screws 29 and preferably also by the lower bolt 31, Figure 1. Before starting the motor, lubricant is poured into the unit through the filler 162 until after filling all the described inter-connected lower spaces of the unit, the lubricant stands approximately at the level indicated by the dot and dash line 184, Figure 2. The tank 170 having been supplied with fuel and the latter admitted to the carburetor 59 via the valve 171 and tube 172, the magneto switch 178 is turned on and the motor started by means of the usual rope (not shown) applied to the notched sheave 166 in a well-known manner.

Rotation of the crankshaft in the direction indicated by an arrow in Figure 1 causes the propellers 93 and 94 to be driven in opposite directions through the previously described shaft and gear combinations shown in Figures 1 and 2. The vertical drive shaft 100 revolves in a counter-clockwise direction viewed from the top, and the shaft 101 revolves clockwise. This rotation of shaft 101 causes the impeller 151 to force lubricant upward through the annular space 148, the upper pocket 144 and the cored passage 149 into the cylinder jacket space 46a. The fluid circulates along and around the cylinder sleeves, about the valve pockets and through openings 185, Figures 1, 4 and 12, into the jacket space 186 of the cylinder head 47. After traversing the head jacket 186 the fluid passes through end passages 186a to the main or crankcase portion of the body 20.

Collecting in the sump 81, the fluid moves down through the annular space 139 in the drive shaft tube 85, thence through the interior 143 of the plate 84, from which it is again forced upward through the shaft tube 86 and the cored passage 149 back to the cylinder jacket. The impeller 150, having the same direction of twist as the impeller 151 but revolving in the opposite direction, exerts a downward thrust on the fluid in the tube 85, thus operating as a backing or booster pump to assist the impeller 151 in maintaining circulation.

Figure 13:
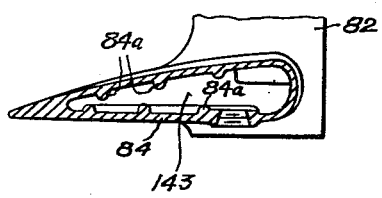
Figure 13 is a fragmental detail section of an alternate form of heat exchanger.
Figure 14:
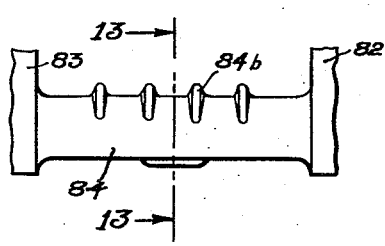
Figure 14 is a front elevation of the same.

From the above description, it will be evident that the lubricating fluid in its passage through the engine jackets acts as a primary coolant for the engine, the heat extracted from the latter being thereafter dissipated partially through the walls of the body 20 to the outer atmosphere, but principally through the walls of the heat-exchanging bridge plate 84 to the water in which the plate is normally immersed. The impellers 150 and 151 are so proportioned as to maintain an ample volume of fluid circulation to provide proper cooling at all times. The heat-exchanger plate 84 may be constructed with interior flanges or ribs 84a, as illustrated in Figure 13, to direct the flow of fluid and increase the interior heat exchange surface between the fluid and the walls of the plate. Longitudinal exterior ribs 84b, Figures 13 and 14, may be disposed on the outer surfaces to increase the heat-exchange area between the plate and the surrounding water if desired on larger or heavy-duty units.

As previously stated, the circulating cooling fluid is also a lubricant. It is therefore evident that lubrication for various bearing surfaces may be provided by tapping into the cooling system at suitable locations.

Referring to Figure 4, the numerals 187 and 188 and 189 denote oil passages from the jacket 46a to the main crank-shaft bearings 69, 69a and 69b respectively. Similarly, passages such as 121, Figure 1, lead from the laterally extending lower portion 192 of the jacket 46a to the various camshaft bearings. The tappet-plungers 80, Figure 1, extend through the lower jacket portion 192 and receive lubrication therefrom directly.

Oil-holes 193, Figures 1 and 4, are disposed in the cylinder sleeves directly above the troughs 71 in the connecting rods 66. Lubricant from the jacket 46a feeds through the holes 193 to lubricate the upper surfaces of the pistons, and a certain amount drops into the connecting rod troughs 77 while the pistons are on the upper portions of their strokes. From the troughs, lubricant passes through the holes 72 and 73 to lubricate the wrist-pins and crank-pins. To ensure ample feed to the troughs 77 at high speed, small spouts 194 may be disposed as illustrated in Figures 1 and 2 so as to clear the lower ends of the pistons at the bottom of their strokes. Oil from the rapidly moving connecting rods and crankshaft is splashed throughout the cylinders and into the interior of the pistons, furnishing lubrication throughout the cylinder walls and also cooling the piston heads. It is further evident that lubricant is thrown about or splashed throughout the entire interior to the body 20, and this splash, together with the fluid returning from the jacket via the passages 186a, lubricates the gearing, cams, chains and other working parts previously described. At points where it is desired to apply a continuous flow of cool lubricant directly to working surfaces, as for example the bevel gear combinations 103—103a and 104—104a, spouts 195, Figure 2, may be connected into the lower jacket portion 192. Small apertures 196, Figure 1, direct lubricant from the jacket 46a on the exhaust valve stems 54 thus lubricating and cooling the stems and springs. This lubricant is caught by a closure plate 197 and returned to the interior of body 20 through holes 198.

Figure 12:
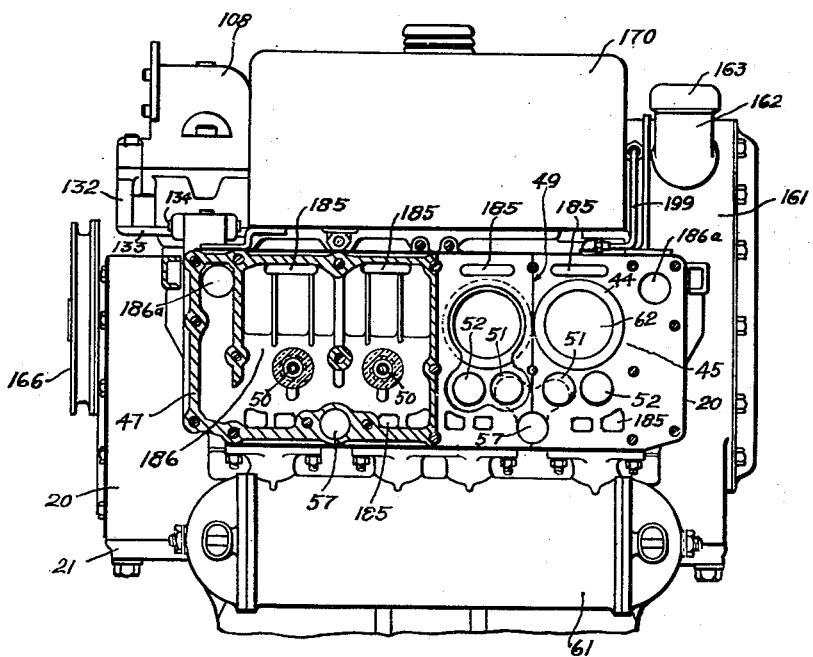
Figure 12 is a rear view of the cylinder body or block with portions of the head and jacket removed.

A tube 199, Figures 2 and 12, leads from the top of the jacket 46a to a pocket 200 about the magneto drive shaft 155. This tube furnishes lubricant to the shaft 155 and also operates as a vent to prevent possible air or vapor lock in the jacket 46a. It will be understood that the jacket outlet openings 186a, Figure 12, are sufficiently constricted as to maintain flow through the tube 199 and the other described lubrication passage under all normal operating conditions, due to the ample pumping capacity of the impellers 150 and 151.

By means of the oil cooling system described, the invention avoids the troubles incident to direct water cooling such as scale deposits, internal corrosion, possible freezing of water in the jackets, etc. It thus accomplishes the advantages of uniform liquid cooling but avoids the complications inherent in the use of a second circulating fluid in addition to the lubricant and which must be kept separated from the latter. In addition to the ease and simplicity with which lubrication is secured by tapping into the cooling system as already described, the invention permits the use of thin iron or steel cylinder sleeves in the aluminum body or bloc 20 without the necessity for press fits with the latter's attendant high cost and difficulties from differences in thermal expansion, since the flanges 44 are clamped by the head 47 and gasket 49, while any seepage of oil along the sleeves into the crankcase is immaterial. Cylinder heat is transmitted through the thin uniform sleeves directly to the coolant, without the necessity of passing through a joint and a second wall of metal, as occurs in the usual engines having wearing sleeves inserted in cylinders forming part of the main bloc.

In the preferred form of the device as illustrated herein, the lower bevel gear combinations 98—99 are lubricated by special gear-grease, filler plugs 201 being provided in the housings 89 and 90. Seals 202 around the vertical shafts 100 and 101 keep the lower gearing lubricant separated from the circulating lubricant in the tubes 85 and 86. In case in some embodiments it is desired to lubricate the lower bevel gear combinations with the same lubricants as that used in the circulating system, the seals 202 may be omitted. To prevent leakage of oil outward or water inward along the outside of the tubes 85 and 86, seals 205 are disposed around the tubes as shown in Figures 1 and 2.

Figure 6A:
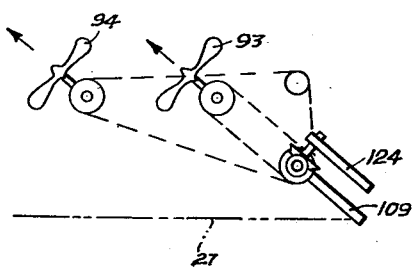
Figure 6a is a similar diagram illustrating parallel swinging of the propellers in normal steering.

The operation of the steering and forward or rear drive control is as follows:

With the reverse lever 124 in the position shown in Figures 1, 3 and 5, both propellers are directed straight astern as illustrated diagrammatically in Figure 6, the boat consequently being driven straight ahead. When it is desired to turn, the tiller 109 is swung in the usual manner. The lever 124 being held by the latch 126 in the quadrant notch 127, the gear 122 and pinions 120 and 121 are locked so that the entire steering head and the tubes 112 and 113 turn as a unit. The turning motion is transmitted equally via the sprockets 114 and 116, the chains 115 and 117, sprockets 87 and 88, and shaft tubes 85 and 86 to the propeller shaft housings 89 and 90, causing the propellers 93 and 94 to be swivelled at equal angles in parallel relation as illustrated in Figure 6a. Thus steering to either side is accomplished at any angle governed by the swing of the tiller, the thrust directions of the two propellers remaining parallel throughout.

Figure 8:
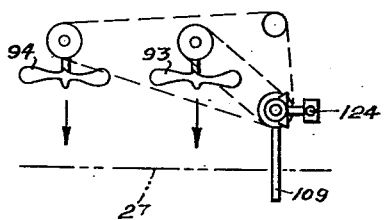
Figure 8 is a similar diagram illustrating the swinging of the propellers into straight reverse driving position.

When it is desired to drive the boat in reverse or to stop forward motion, the lever 124 is thrown upward through 90 degrees until the latch 126 engages the upper notch 129, Figures 1, 3 and 5. In the embodiment illustrated in Figures 1, 2, 3 and 5, the steering head gear 122 has double the pitch diameters of its meshing pinions 120 and 121. Consequently, the rotation of the gear 122 through 90 degrees rotates the pinions through 180 degrees in opposite directions, and these motions are transmitted through the previously described sprocket and chain mechanisms, causing the propellers 93 and 94 to be swivelled outward and forward through 180 degrees to the direct reverse driving position illustrated in Figure 8. Obviously, the boat may be steered in reverse by swinging the tiller as usual, the engagement of the latch 126 in notch 129 holding the steering head gear locked and causing the propellers to be swivelled in parallel in the same manner as described for forward driving position.

Figure 7:
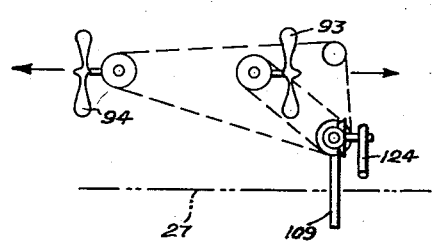
Figure 7 is a similar diagram showing the propellers swung outward to neutral position.

Figure 7 illustrates a neutral positions, in which the reverse lever 124 is swung to an intermediate position, the latch 127 occupying the notch 128 and the tiller 109 being in central position. In this position, both propellers are turned laterally outward and while they may continue to revolve, their thrusts are directed outward in opposite directions and consequently transmit no motion to the boat.

Figure 7A:
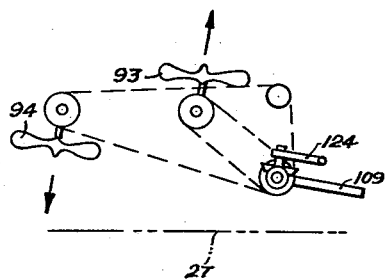
Figure 7a illustrates one propeller directed forward and one aft.

Should it be desired to turn in very short space, the propellers may be placed in neutral position as described and the tiller 109 is thrown hard over to either side desired, as illustrated in Figure 7a. This operation directs one propeller forward and the other astern, giving the same powerful turning effect as that achieved by reversing one engine of a twin-screw vessel.

Figure 9:
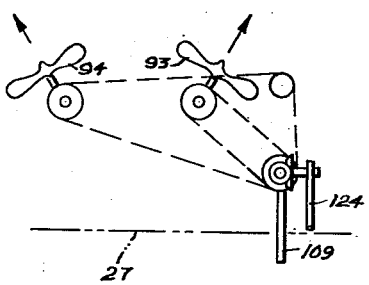
Figure 9 illustrates a propeller setting between neutral and forward driving positions.

Obviously any desired number of relative angular propeller settings intermediate those described may be secured, for which any number of corresponding notches such as 127a and 128a, Figure 5, may be provided in the quadrant 130. Figure 9 illustrates an intermediate propeller position between forward and neutral, as when the latch 126 is engaged in notch 127a. This setting causes only a component of the propeller thrusts to be transmitted to the boat, in case, for example, where it is desired to move at speed below the normal lowest speed attainable with throttled engine and parallel propeller drive. A swing of the tiller can be utilized to direct one propeller astern and the other outboard to any degree within the range of the tiller.

It is obvious that any other desired combination of reverse lever position and tiller operation can be effected to facilitate maneuvering and speed control.

Figure 11:
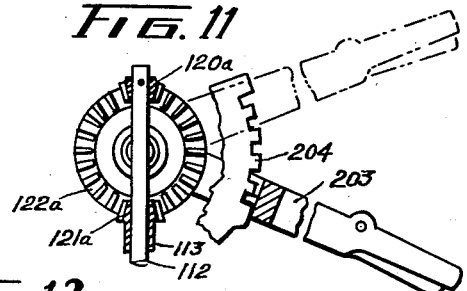
Figure 11 illustrates a modification in which steering and reverse control are accomplished by the same lever or tiller.

In the embodiment of the invention already described, the tiller 109 and reverse lever 124 are separate members. Figure 11 illustrates a modification in which a single lever 203 is utilized both for steering and reverse control. To provide proper steering leverage in reverse position, the ratio of the pitch diameter of the steering head gear 122a is made larger in proportion to that of the pinions 120a and 121a, thus decreasing the upward angular arc of the lever 203 along the locking segment 204 necessary to throw the device into reverse position. Additional reversing leverage to compensate for the decreased angular movement may be secured by increased length of the lever 203. In addition to operation of the device with the reverse lever latched to any one of the notches, the operator may also hold the lever unlatched in any intermediate position and shift it back and forth at will, giving a high degree of maneuverability.

From the foregoing description it is evident that the device provides the effect of an infinite speed ratio between the engine and the boat, from full speed ahead through neutral to full astern, without the use of change gears, clutches, feathering-blade propellers or the like. It is well known that the reversal of a boat by swinging a single propeller through 180 degrees as in some prior outboard practice presents difficulties and some hazard, especially if attempted in emergency at high speed and with a powerful motor, since the lateral thrust during the swing tends to throw the boat stern around. With the present invention the lateral thrusts of the two propellers remain in balance during their swings, eliminating the above difficulties. Obviously the device, while containing no clutch or feathering blade propeller, allows the engine to be started and warmed up before starting the boat, and similarly the boat may be stopped without stopping the engine.

Although in idling or neutral position no drive is communicated to the boat, the propellers still revolve in the water, reducing tendency to the injurious racing of the motor common to drives employing releasing clutches. By the combined operation of the reversing lever and tiller, as previously noted, the unit achieves the maneuvering advantages of a twin engine drive but with a single engine and means of control.

With dynamic steering by means of a single propeller driven by a single vertical shaft, as in prior outboard practice, the vertical drive results in torque in one direction which reacts on the steering means. In the case of motors wherein only the lower unit is turned in steering, the unidirectional torque is the direct result of propeller resistance on the lower level gear combination, while in motors in which the entire plant including the power head is turned, the torque is the resultant of unbalance between torque reaction and torque vibration. In either case the unidirectional force makes steering harder in one direction than the other, and requires the use of various locking devices to assist in holding a course and to prevent the propeller from kicking or "walking" around if the tiller is released. In the present invention, wherein the two vertical drives operate in opposite directions, the torque reactions automatically neutralize each other in the locked steering head, so that steering is substantially balanced and equally easy in either direction. It is obvious that this elimination of torque resistance to steering is highly advantageous both in point of comfort and safety, especially in the case of comparatively powerful motors.

While the invention has been described in preferred form, it is not limited to the exact embodiments illustrated, as various changes and modifications may be made without departing from the scope of the appended claims.

The structure of the present invention, in addition to providing balanced steering as set forth, also relieves the boat of the effects of unbalanced torque reaction about the propeller shaft axes. In single propeller craft this torque reaction causes a tendency to listing or canting of the hull to one side through various degrees, dependent on the proportion of propeller torque to hull dimensions, and is so serious a factor in high powered craft as to cause danger of capsizing if a turn is made at high speed in a direction wherein centrifugal force acts in the same direction as the torque list. Furthermore, the variations in hull list necessary to resist propeller torque, which variations arise particularly in rough water, tend to give the boat a twisting and generally unstable motion through and over the water.

In high speed ships and large motorboats, the above-mentioned difficulties have been met by the use of multiple engine and propeller equipment, wherein oppositely turning propellers allow the torque reactions to be substantially balanced within the hull structure if propeller speeds are so regulated as to be approximately the same. The present invention provides automatic torque balance but also relieves the hull of stresses incident thereto, since the balance is accomplished entirely within the rigid structure of the propelling unit itself, thus automatically giving the advantage of twin screw stability while permitting the application of high power to hulls of any desired type including, for example, very light outboard racing types.

What is claimed is:

1. In a device of the character described, in combination, an internal combustion engine having a cylinder and a jacket thereabout, means to secure said engine to a boat, a pair of lower casings, shafts journalled in said casings, said casings being adapted to contain lubricant for said shafts, propellers on said shafts, hollow housings connecting said lower casings with said engine whereby said casings may be immersed in water, a transverse heat exchanger connecting said housings and adapted to be immersed in said water above said propellers, driving means in said housings and operatively connecting said engine and said propeller shafts, means to circulate a volume of lubricating fluid through said heat exchanger, a conduit adapted to direct a substantial portion of said fluid through said jacket to cool said cylinder, means forming passages to direct portions of said circulating fluid to working surfaces of said engine, and sealing means between said lower casings and said connecting housings to isolate said propeller shaft lubricant from said circulating fluid.

2. The combination claimed in claim 1 wherein said driving means includes upright shafts in said housings, and wherein said circulating means includes impellers on said upright shafts and cooperative in series relation to force said fluid down one of said housings, through said heat exchanger, and up said other housing.

3. In a marine propelling unit, in combination, an internal combustion engine having a casing, a transverse main shaft in said casing, a pair of hollow columns on the bottom of said casing, two vertical tubes rotatably mounted in said respective columns, vertical drive shafts in said tubes, said drive shafts being of smaller diameter than the interiors of said tubes whereby annular spaces are comprised therebetween, housings secured to the lower ends of said tubes, propeller shafts journalled in said housings and geared to said vertical shafts, propellers secured to outboard ends of said propeller shafts, gear means connecting said main shaft to said vertical shafts to drive said vertical shafts, a steering pivot journalled in said casing, a steering sleeve rotatably mounted on said steering pivot, means in said casing operatively connecting said pivot and sleeve respectively to said first and second tubes to rotate said columns and housings, means forming a sump in said casing in communication with one of said annular spaces, a cylinder on said casing, a jacket about said cylinder and having a communication with said second annular spaces, a heat exchanger connected to said two columns and comprising a fluid communication between the lower portions of said two annular spaces, means to force a lubricating fluid from said sump through said first annular space, said heat exchanger, and said second annular space into said jacket to cool said cylinder, and means to deliver said lubricating fluid from said jacket to said driving gear means, said steering connecting means and said sump.

4. In a marine propulsion unit having an internal combustion engine including working parts and a crank-case and a jacket structure thereon, in combination, a cylinder sleeve inside said jacket structure, said cylinder sleeve being fastened at its outer end to said structure and its inner end slidably supported in the juncture of said jacket structure and said crank-case, means to circulate a cooling and lubricating fluid through said jacket in contact with said sleeve to establish a cooling system for the same, means forming passages to direct portions of said fluid from said cooling system to said working parts, dual propelling means attached to said engine and operable thereby, said propelling means including shafts and propellers thereon, means to lubricate said shafts independently of said circulating cooling and lubricating fluid, and means to secure said engine to a marine craft whereby said propellers may be immersed in water, said fluid circulating system including a heat exchanger adapted to engage said water above said propellers.

5. In a marine propulsion unit including an engine and a propeller operatively connected thereto, in combination, a hollow anti-cavitation plate above said propeller and adapted to be submerged in water, means to circulate lubricant through said engine and said anti-cavitation plate in heat-exchanging relation with said water, whereby said anti-cavitation plate may operate as a cooler for said lubricant, and a gear casing below said plate and adapted to contain a second lubricant, said propeller being mounted on a shaft journalled in said gear casing.

References Cited in the file of this patent

UNITED STATES PATENTS

| Number | Name | Date |
|---|---|---|
| 1,318,706 | Talbot | Oct. 14, 1919 |
| 1,446,775 | Wahl | Feb. 27, 1923 |
| 1,567,512 | Johnson | Dec. 29, 1925 |
| 1,617,845 | Hall | Feb. 15, 1927 |
| 1,762,957 | Beuhner | June 10, 1930 |
| 1,822,573 | Fitzgerald | Sept. 8, 1931 |
| 2,021,309 | Irgens | Nov. 19, 1935 |
| 2,085,810 | Ljungstrom | July 6, 1937 |
| 2,096,037 | Harvey | Oct. 19, 1937 |
| 2,386,362 | Soldner | Oct. 9, 1945 |

FOREIGN PATENTS

| Number | Country | Date |
|---|---|---|
| 678,712 | France | Jan. 2, 1930 |